(12) United States Patent
Flynn et al.

(10) Patent No.: US 6,367,689 B1
(45) Date of Patent: *Apr. 9, 2002

(54) ENVELOPE WITH A TAB

(76) Inventors: Timothy J. Flynn, 18 Caloosa Rd., Key Largo, FL (US) 33037; Patrick J. Flynn, 107 Jennifer St., Redlands, CA (US) 92373; Kenneth A. Kritz, 7203 Inverway, Crystal Lake, IL (US) 60014

(*) Notice: Subject to any disclaimer, the term of this patent is extended or adjusted under 35 U.S.C. 154(b) by 0 days.

This patent is subject to a terminal disclaimer.

(21) Appl. No.: 09/415,802

(22) Filed: Oct. 11, 1999

Related U.S. Application Data (63) Continuation-in-part of application No. 09/412,466, filed on Oct. 5, 1999.

(51) Int. Cl.[7] ............................................. B65D 27/04
(52) U.S. Cl. ...................... 229/68.1; 229/67.1; 229/75; 206/308.1
(58) Field of Search .............................. 229/67.1, 68.1, 229/71, 75; 206/312, 311, 308.1

(56) References Cited

U.S. PATENT DOCUMENTS

| | | |
|---|---|---|
| 1,259,322 A | 3/1918 | Vawter |
| 1,273,960 A | 7/1918 | Wagemaker |

(List continued on next page.)

FOREIGN PATENT DOCUMENTS

| | | | | |
|---|---|---|---|---|
| CA | 466094 | * | 6/1950 | .................. 206/312 |
| EP | 693 442 | | 1/1996 | |

OTHER PUBLICATIONS

CD envelope with a window, No Author, No Date.
Avery 5266 Assorted File Folder Labels (2 pages of Packaging), No Date.
Advertisement of LabelGear CD Sleeves, Microvision Development, Inc., with attached specimen of CD sleeve product (2 pages total), No Date.
CD–R Disc Labels, Avery (5 pages including 2 pages of Formatting and Printing Tips, 2 pages of Laser. CD–R Disc Labels Practice Sheet, and 1 page of Avery #5824 labels (2 labels), No Date.
Labels, A. *Products Knowledge Book*, National Business Forms Association, Alexandria, Virgina (1983).
CDSTICKE: CD Labels–Compact Disc Labels, Internet advertisement, http://www.cdsticke.com, 2 pages, 1999.

*Primary Examiner*—Jes F. Pascua
(74) *Attorney, Agent, or Firm*—Pauley Petersen Kinne & Erickson (57) ABSTRACT

An envelope, or envelope assembly, having a removable panel. The removable panel can be printed upon simultaneously while the envelope, or envelope assembly, is being printed upon. The removable panel can be removed from the envelope, or envelope assembly, and adhered to another surface. A protective panel and an adhesive coating partially or totally cover one side of the removable panel. Furthermore, the protective panel and the adhesive coating can partially or totally cover one side of the envelope assembly. The protective panel is preferably transparent or translucent, thereby enabling inspection of the contents of the envelope from outside the envelope once the removable panel is removed. Additionally, a tab can extend from a surface of the envelope for ease of identification and organization.

23 Claims, 11 Drawing Sheets

U.S. PATENT DOCUMENTS

| | | | |
|---|---|---|---|
| 1,336,270 A | 4/1920 | Zimmerman | |
| 1,460,761 A | 7/1923 | McPike et al. | |
| 1,757,122 A | 5/1930 | Hunter | |
| 1,743,191 A | 7/1930 | Charlton | |
| 1,922,213 A | * 8/1933 | Middleton | 229/67.1 |
| 2,345,793 A | * 4/1944 | Chapel | 229/67.1 |
| 2,986,325 A | * 5/1961 | Loderhose | 206/312 |
| 3,061,172 A | * 10/1962 | Loderhose | 206/312 |
| 3,371,850 A | * 3/1968 | Gorman | 229/68.1 |
| 3,774,839 A | * 11/1973 | Woods | 206/312 |
| 4,035,218 A | 7/1977 | Yount | |
| 4,110,502 A | 8/1978 | Baer | |
| 4,334,618 A | 6/1982 | Buescher | |
| 4,492,308 A | 1/1985 | Meeker et al. | |
| 4,708,285 A | * 11/1987 | Segall | 229/68.1 |
| 4,809,905 A | 3/1989 | Goodman | |
| 4,863,537 A | 9/1989 | Sadri | |
| 4,868,027 A | 9/1989 | Hunkeler et al. | |
| 4,923,111 A | * 5/1990 | Down | 229/67.1 |
| 5,050,792 A | * 9/1991 | Segall | 229/68.1 |
| 5,052,613 A | * 10/1991 | Lin | 229/71 X |
| 5,071,167 A | 12/1991 | O'Brien | |
| 5,209,353 A | * 5/1993 | Lehtovaara | 206/312 X |
| 5,262,216 A | 11/1993 | Popat et al. | |
| 5,296,279 A | 3/1994 | Birnbaum et al. | |
| 5,316,344 A | 5/1994 | Popat et al. | |
| 5,333,780 A | * 8/1994 | Scott | 229/75 |
| 5,340,427 A | 8/1994 | Cusack et al. | |
| 5,348,216 A | * 9/1994 | Scott | 229/75 |
| 5,545,087 A | * 8/1996 | Seward | 462/2 |
| 5,579,908 A | * 12/1996 | Johnson | 229/67.1 X |
| 5,587,214 A | 12/1996 | Mitchell, Jr. | |
| 5,738,748 A | 4/1998 | Mitchell, Jr. | |
| 5,752,652 A | 5/1998 | Castro | |
| 6,213,312 B1 | * 4/2001 | Thielsen | 211/40 |

* cited by examiner

ENVELOPE WITH A TAB

This application is a continuation-in-part of U.S. patent application Ser. No. 09/412,466, filed Oct. 5, 1999, the disclosure of which is incorporated herein by reference.

BACKGROUND OF THE INVENTION

1. Field of the Invention

This invention is directed to an envelope, or an envelope assembly, having a removable panel with an adhesive coating on one side such that the removable panel can be separated from the envelope, or the envelope assembly, and adhered to another surface. The invention is also directed to an envelope, or envelope assembly, having a tab. The envelope, or the envelope assembly, can be fed through a printer, such as a laser printer, an ink jet printer, an impact printer, a thermal transfer printer, a direct thermal printer, a typewriter, or any other suitable graphic printing device.

2. Description of Related Art

Envelopes can be used to hold a wide variety of items, including letters, documents, compact discs, pictures, baseball cards, and the like. Quite often, it is desirable to have a label for adhering to items within an envelope. In order to label items and store them in envelopes, one must purchase the envelopes and the labels separately. Furthermore, an outside surface of the envelope usually must be labeled to indicate what the contents are inside the envelope.

An envelope having a window is one way to reveal the contents of an envelope, but labels must still be purchased separately in order to label the contents themselves. If the labels and the envelopes are separate items, they cannot be run through a printer simultaneously.

A further setback in envelope organization is difficulty in distinguishing one envelope from another. When envelopes are aligned in a row, they typically all look alike. Even when a surface of an envelope is labeled, one must usually sort through a number of envelopes, looking at an entire surface of each one, before finding the sought-after envelope.

Accordingly, a need exists for a new and improved envelope, or envelope assembly, that provides means for labeling the envelope and any contents within the envelope. A need also exists for an envelope that can be more easily identified and organized.

SUMMARY OF THE INVENTION

The present invention relates to an envelope, or an envelope assembly, with a removable panel that can be printed upon simultaneously while printing upon the envelope or envelope assembly. The envelope, or envelope assembly, can further comprise a tab for ease of identification and organization.

The envelope assembly includes a sheet of material having a printable surface on one side and an adhesive covered by a protective panel on another side. The sheet of material comprises an assembly shape preferably having a primary panel adjacent a secondary panel. At least one flap is preferably but not necessarily located along at least one edge of the primary panel and/or the secondary panel.

In one preferred embodiment, the sheet of material is rectangular with perforated, micro-perforated or die-cut lines located around at least a portion of a periphery of the assembly shape, thereby separating the assembly shape from a remainder portion of the material.

The protective panel is preferably transparent or translucent. The adhesive coating at least partially covers one side of the removable panel. When the removable panel is removed from a remainder of the envelope or envelope assembly, the transparent or translucent protective panel enables a user to view any contents of the envelope from outside the envelope.

In one preferred embodiment, the primary panel, the secondary panel and/or the remainder portion of the material is preferably die-cut to form the removable panel. The removable panel can be in a shape of a compact disc label, for example, so that graphics can be printed upon the printable surface of the primary panel and/or the secondary panel, and the removable panel can then be separated from the primary panel and/or the secondary panel and adhered to a compact disc.

The adhesive coating also at least partially covers one side of the at least one flap, and/or at least one edge of the primary panel and/or at least one edge of the secondary panel. The protective panel can be removed to expose the adhesive coating. In one preferred embodiment of this invention, the adhesive coating entirely covers one side of the sheet of material. In another preferred embodiment of this invention, the adhesive coating only partially covers the one side of the sheet of material. The protective panel preferably has at least one tearable line of separation, such that a portion of the protective panel can be separated from a remaining portion, such as a border portion, of the protective panel. The tearable lines of separation are preferably located along fold lines of the flaps.

To form an envelope, the protective panel is first partially or completely separated from the adhesive to expose the adhesive on each flap, edge of the primary panel and/or edge of the secondary panel. The flaps and/or the secondary panel are then folded toward the primary panel such that surfaces with exposed adhesive are aligned to contact surfaces to which they can adhere, thereby forming an envelope.

In one preferred embodiment, at least one tab extends outward from the primary panel and/or the secondary panel. A flap can be die-cut about a portion of a periphery of the tab, such that the tab remains extending outward while the flap can be folded over and adhered to either the primary panel or the secondary panel. The tab can be printed upon directly, or alternatively, the removable panel can be of a size and shape suitable to be adhered to the tab.

The envelope assembly of the present invention can be designed and constructed in a wide range of sizes for a number of different uses. In particular, the envelope assembly is suitable for housing compact discs, mini-discs, baseball cards, photographs, and many other items.

It is therefore an object of the present invention to provide an envelope, or an envelope assembly, that has a removable panel.

It is a further object of the present invention to provide an envelope, or an envelope assembly, with a tab extending from a surface of the envelope or envelope assembly.

The foregoing and other features and advantages of the present invention will become further apparent from the following detailed description of the presently preferred embodiments, read in conjunction with the accompanying drawings. The detailed description and drawings are intended to illustrate the present invention rather than limit the scope of the present invention as defined by the appended claims and equivalents of the appended claims.

BRIEF DESCRIPTION OF THE DRAWINGS

The present invention can be better understood with reference to the following drawings. In the drawings, like reference numerals designate corresponding parts throughout the several views. Moreover, it should be noted that the drawings are not necessarily to scale, emphasis instead being placed upon clearly illustrating principles of the present invention.

DETAILED DESCRIPTION OF PREFERRED EMBODIMENTS

Figure 1:
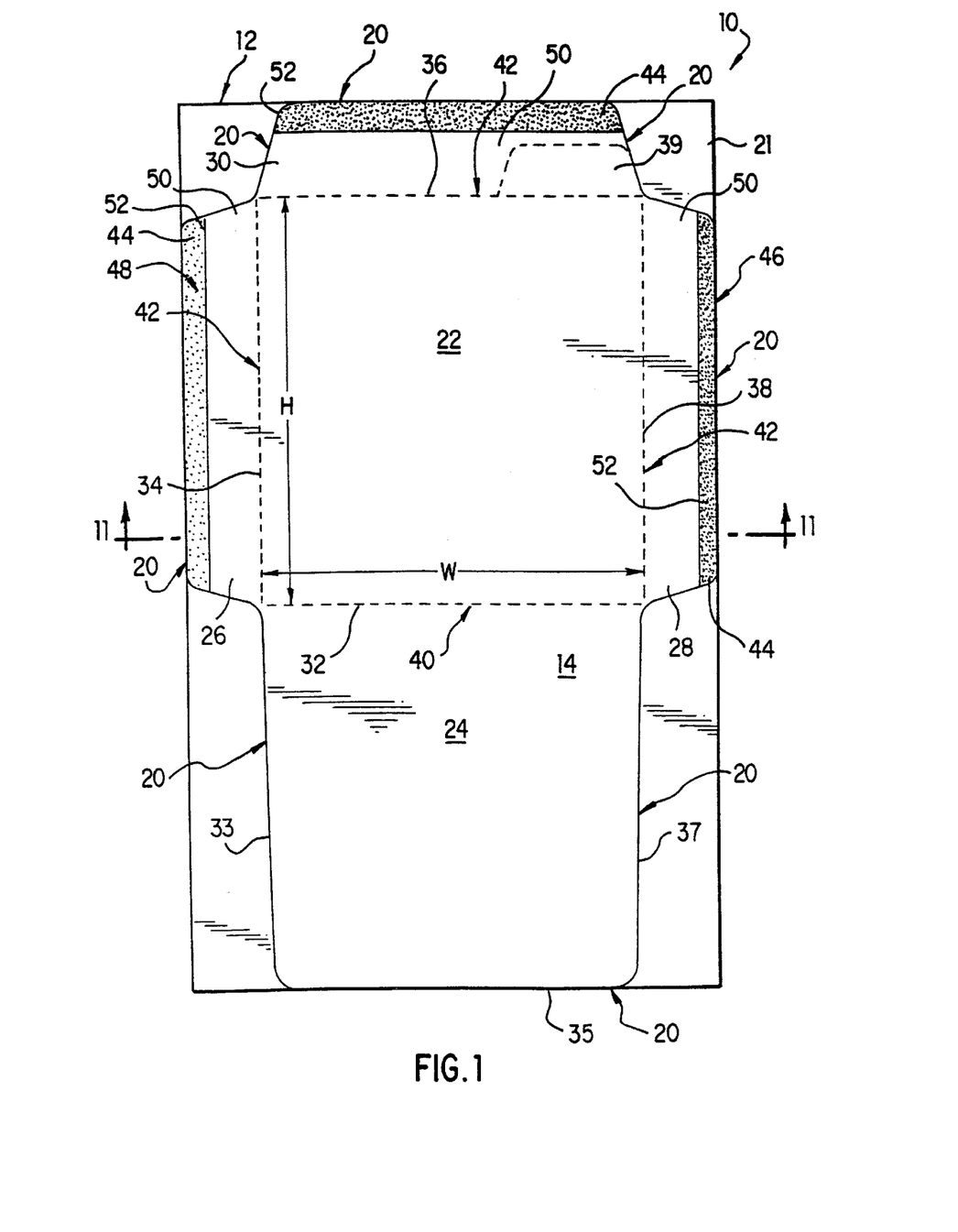
FIG. 1 illustrates a front plan view of a first preferred embodiment of an envelope assembly in sheet form and an unfolded position, showing three areas, each where a protective panel is removed, thereby exposing a layer of adhesive coating.
Figure 2:
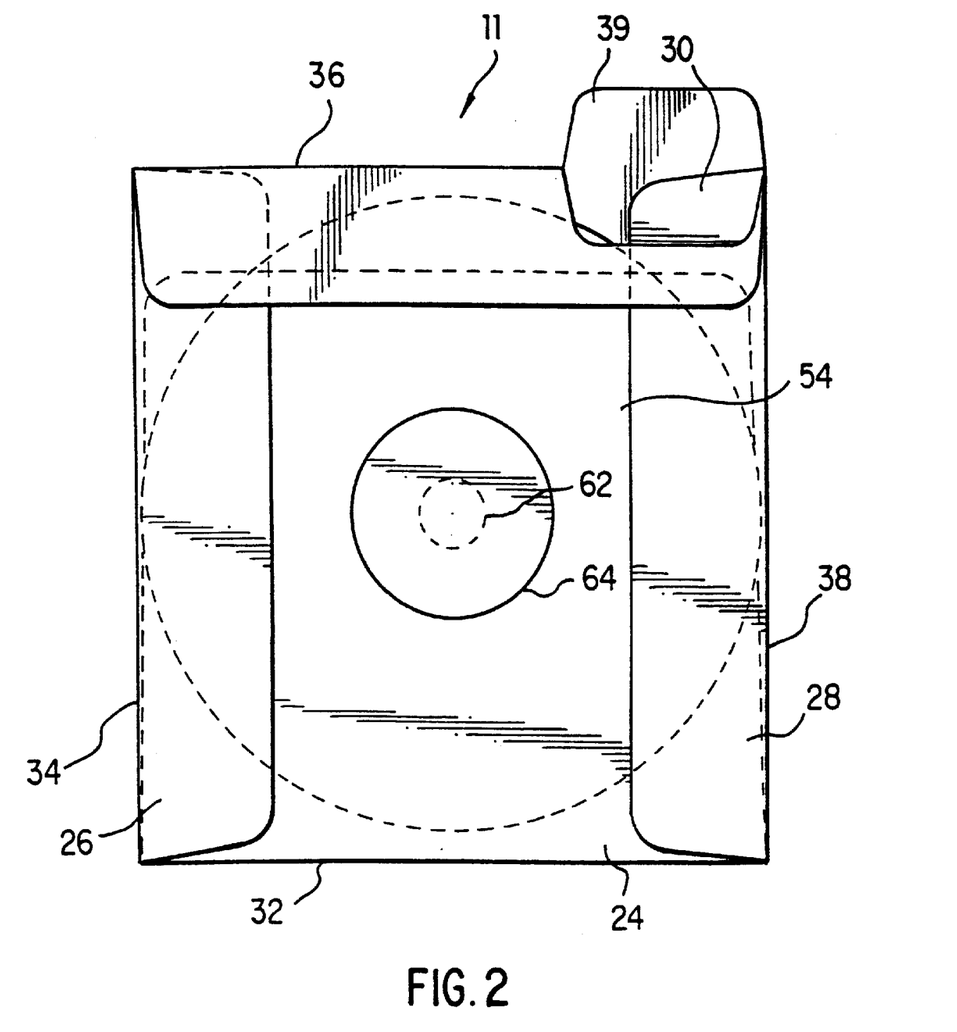
FIG. 2 illustrates a front plan view of the envelope assembly shown in FIG. 1 but in a folded position with a compact disc inserted within a pocket formed by the folded envelope assembly.
Figure 3:
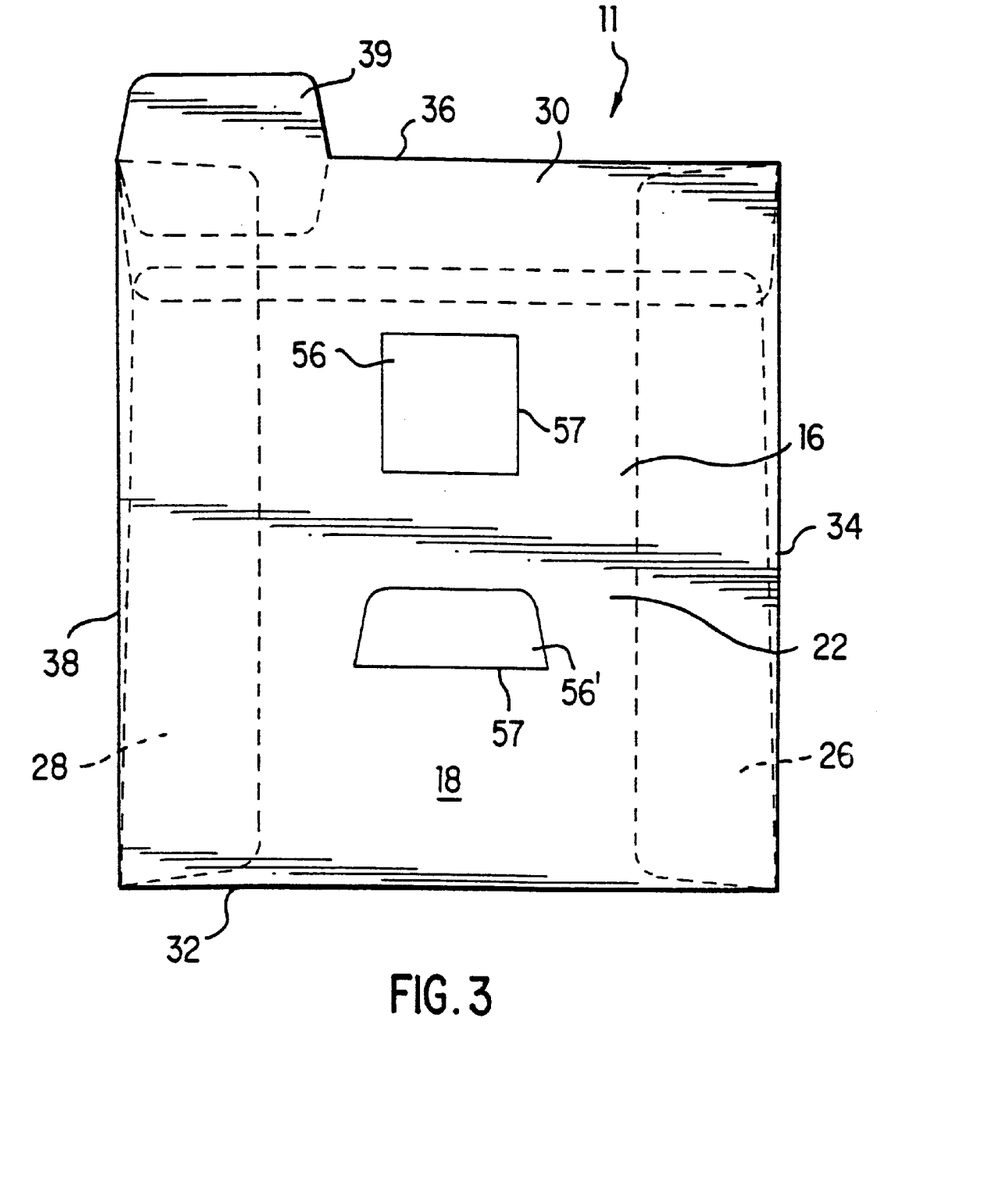
FIG. 3 illustrates a rear plan view of the envelope assembly shown in FIGS. 1 and 2, in a folded position.
Figure 4:
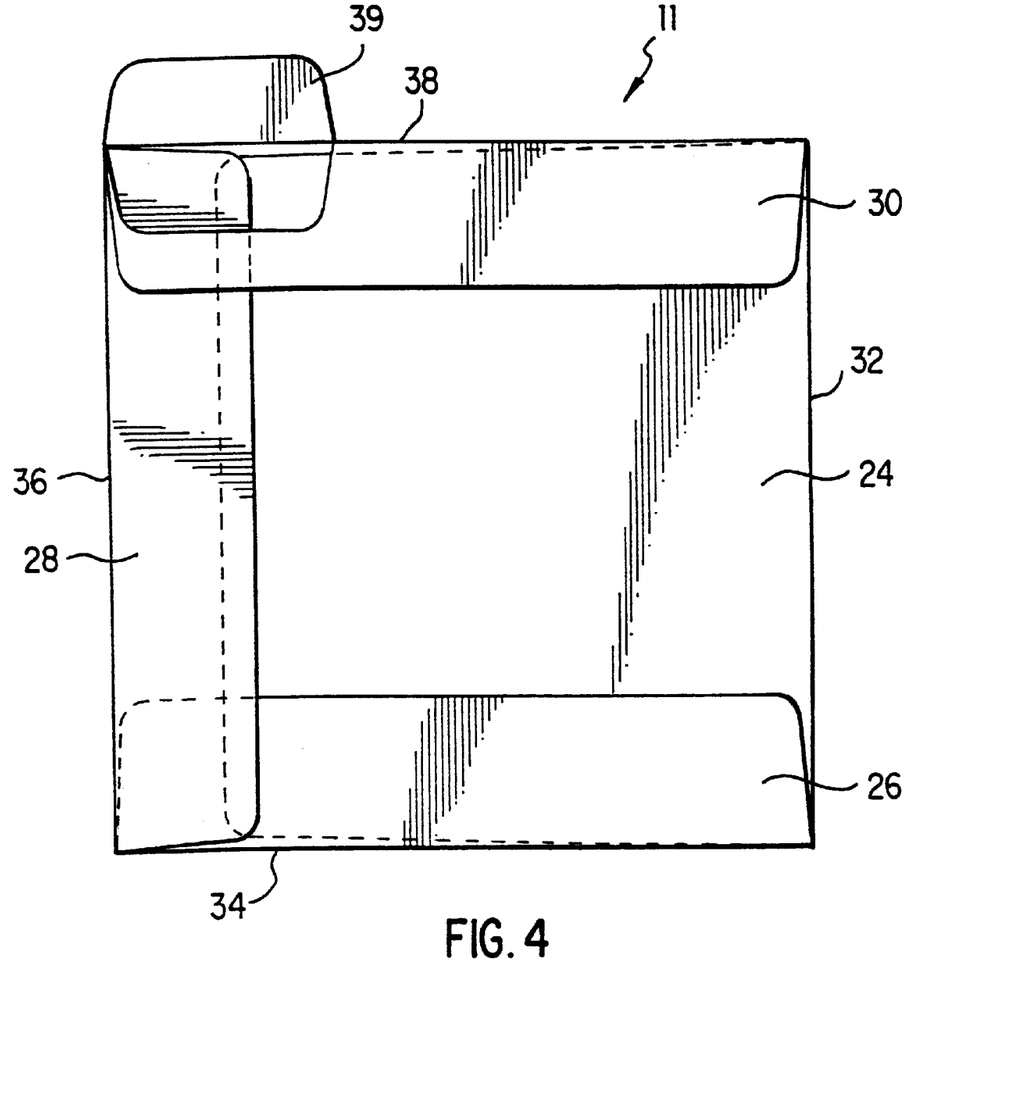
FIG. 4 illustrates a front plan view of a second preferred embodiment of the envelope assembly in a folded position.

FIGS. 1, 2 and 3 illustrate a first preferred embodiment of an envelope assembly 10 in accordance with the present invention. As generally shown in FIG. 1, an envelope assembly 10 comprises a sheet 12 of material that can be fed into and run through a printer. An assembly shape 20, which may also be referred to as a tearable shape, can then be separated from a remaining portion 21 of the sheet 12 and folded into an envelope 11 for holding, for example, a compact disc 54, as shown in FIG. 2. A removable panel 56 and 56', as shown in FIG. 3, can be separated from the sheet 12 as a label and adhered to a separate surface. Regardless of whether the envelope 11 comprises the removable panel 56, the envelope 11 can comprise a tab 39 for organizational purposes.

Referring still generally to FIG. 1, the sheet 12 is of any suitable shape, and generally any suitable size that can be accepted by and fed through a printer, such as a laser printer or an ink jet printer. Common sizes of paper generally fed through printers are 8.5"×5.5", 8.5"×11", 8.263"×11.688" (A4), and 8.5"×14". The sheet 12 is preferably but not necessarily constructed of any suitable paper or paper composite material that can be used as a label. Other suitable materials for constructing the sheet 12 include fabric and plastic. An adhesive coating 44 covered by a protective panel 50 is applied to a first side 14 of the sheet 12. The sheet 12 preferably has a printable surface 16 on a second side 18, as shown in FIG. 3. The printable surface 16 can be any of a variety of face materials used to make pressure sensitive labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts, such as the removable panel 56 and/or the tab 39.

As used throughout this specification and in the claims, the term printable surface relates to a surface of any type of matter upon which a person or machine can draw, print, color, paint, photocopy, write, emboss, or make any other type of mark or graphic. Laser printers, ink jet printers, impact printers, thermal transfer printers, direct thermal printers, typewriters, or any other suitable graphic printing devices are preferred but not necessary for use with printable surfaces according to this invention.

Still referring generally to FIG. 1, within the sheet 12 is an assembly shape 20 comprising a primary panel 22, a secondary panel 24 and at least one, preferably two, more preferably three flaps 26, 28 and 30. As used throughout this specification and in the claims, the phrase assembly shape, or the phrase tearable shape, is intended to relate to a shape, such as the shape identified in FIG. 1 by element reference numerals 20, that can be torn away from a remaining portion 21 of the sheet 12, by using tearable lines, such as die-cut lines, perforated lines, micro-perforated lines or any other suitable structure that enables separation. The assembly shape 20 can be die-cut along at least a portion of a periphery, defined by perforations, and/or defined by micro-perforations, such that the assembly shape 20 can be easily removed or separated from a remaining portion 21 of the sheet 12, for example after the sheet 12 is run through a printer.

In one preferred embodiment, the primary panel 22 can be square or rectangular, thereby having four edges 32, 34, 36 and 38. In one preferred embodiment, the primary panel 22 has a width (W) in a range between about 4.75"and about 5.25", and a height (H) in a range between about 4.75 and about 5.25". In other embodiments, the primary panel 22 can have any suitable circular, polygonal or non-polygonal shape. The secondary panel 24 is located along the edge 32 of the primary panel 22. A primary fold line 40, which may or may not be marked with score lines, perforations and/or micro-perforations, is located at the edge 32 where the primary panel 22 and the secondary panel 24 meet. Each of the flaps 26, 28 and 30 are located at separate edges 34, 36 and 38 of the primary panel 22. Alternatively, at least one of the flaps 26, 28 and 30 can be located at a corresponding edge 33, 35 or 37 of the secondary panel 24. Secondary fold lines 42, possibly marked with score lines, perforations and/or micro-perforations, are located at the edges 34, 36 and 38 of the primary panel 22 where each of the flaps 26, 28 and 30 and the primary panel 22 meet, and possibly at a junction between the secondary panel 24 and any of the flaps 26, 28 and 30.

In one preferred embodiment, the envelope assembly 10 comprises three flaps 26, 28 and 30, one located along each edge 34, 36 and 38 of the primary panel 22 not occupied by the secondary panel 24, as shown in FIGS. 1–4, 7 and 10. Flap 30 can be partially coated with a suitable adhesive to form an adhesive coating 44 for securely sealing the envelope assembly 10. Alternatively, no adhesive coating 44 is applied to the flap 30, or the flap 30 comprises a resealable type of closure, as known by those skilled in the art, such that the envelope assembly 10 can be sealed and opened multiple times without tearing or otherwise distorting the sheet 12. In a further alternative embodiment, illustrated in FIGS. 8 and 9, the flap 30 is located along one of the edges 33, 35 and 37 of the secondary panel 24. When flaps 26 and 28 are located on opposite edges 34 and 38 of the primary panel 22 and the edge 36 remains flapless, the assembly shape 20 without any remaining portion 21 of the material can easily be fed through a printer, with the edge 36 being fed first.

As shown in FIGS. 1–4 and 8, the tab 39 can be formed within or integrated as part of the flap 30. More specifically, the flap 30 is die-cut about a portion of a periphery of the tab 39. The tab 39 can then be separated from the flap 30 along the periphery of the tab 39, such that when the flap 30 is folded over, the tab 39 remains extended outward from the primary panel 22 and generally within a same plane as the primary panel 22. Any number of the tabs 39 can be formed within any of the flaps 26, 28 and 30, and/or within the primary panel 22 and/or the secondary panel 24.

Figure 5:
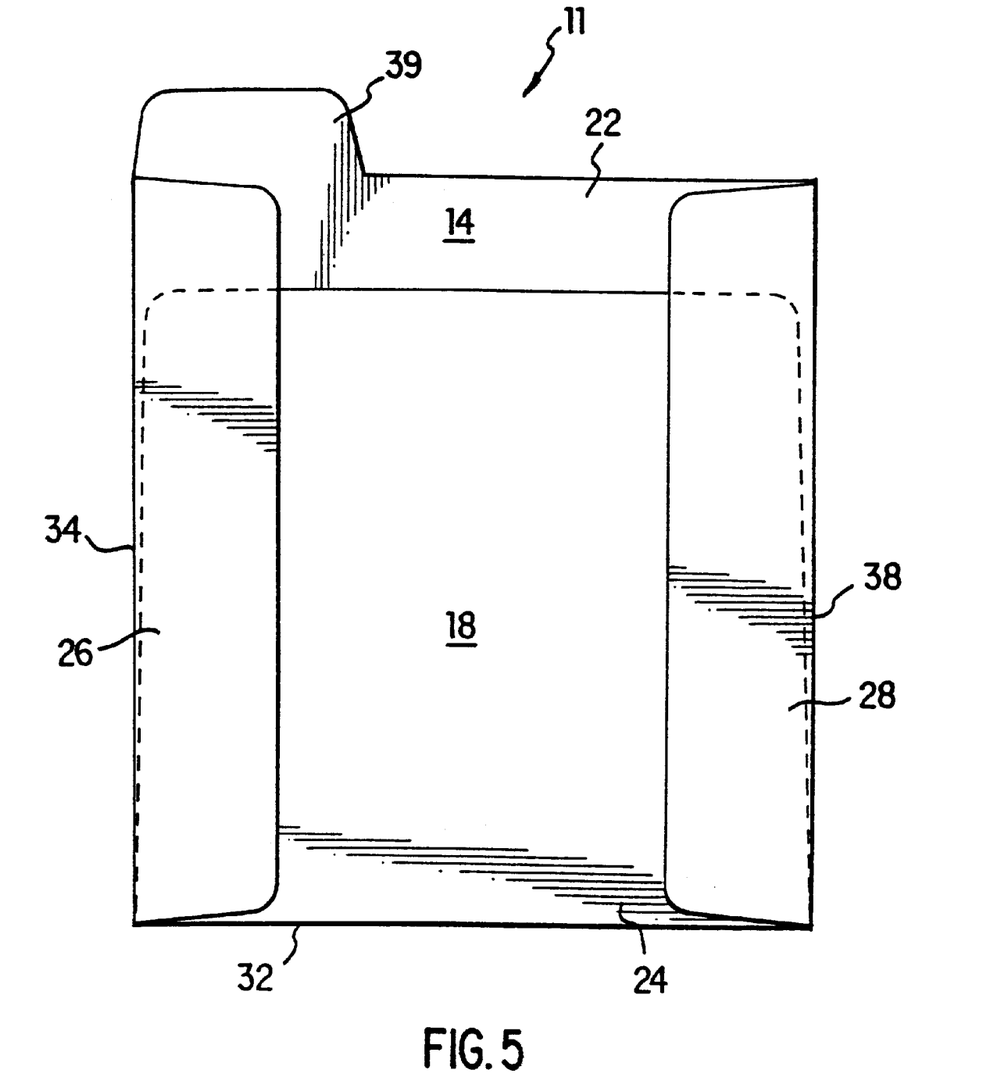
FIG. 5 illustrates a front plan view of a third preferred embodiment of the envelope assembly, having only two flaps, in a folded position.
Figure 6:
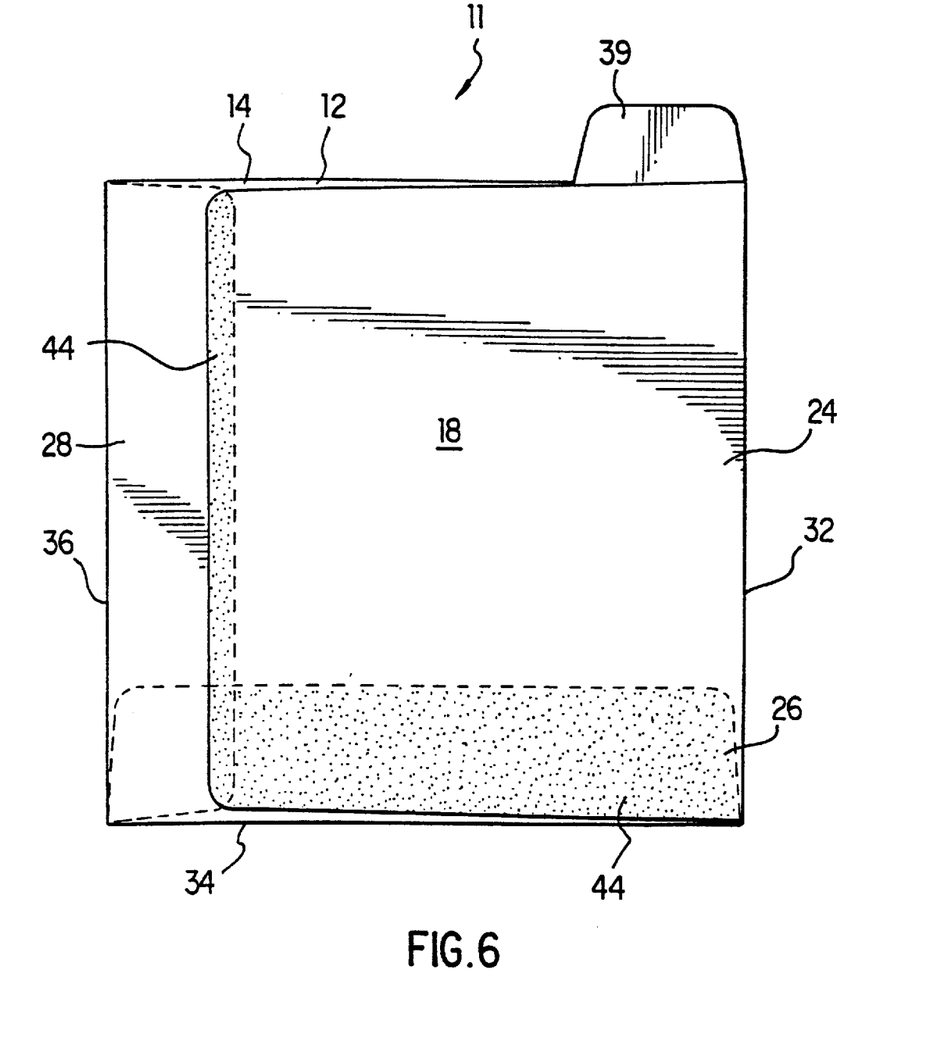
FIG. 6 illustrates a front plan view of a fourth preferred embodiment of the envelope assembly, in a folded position, having only two flaps, and having an adhesive coating only on a secondary panel.

In other embodiments having only two flaps 26 and 28, the flaps 26 and 28 can be located either on the two opposing edges 34 and 38 adjacent the edge 32 on which the secondary panel 24 is located, as shown in FIG. 5, or on the edge 36 opposite the secondary panel 24 and on the edge 34 adjacent the edge 32 on which the secondary panel 24 is located, as shown in FIG. 6. In a further embodiment, one flap 26 can be located on one of the edges 34, 36 and 38 of the primary panel 22 and the other flap 28 can be located on one of the edges 33, 35 and 37 of the secondary panel 24. It is apparent that any number of flaps can be located at any position which is suitable for adhering one or more of the flaps 26, 28 and/or 30 to the primary panel 22 and/or the secondary panel 24.

In an embodiment of the present invention having only two flaps 26 and 28, the tab 39 is formed within a periphery or integrated as a part of the assembly shape 20, such as shown in FIGS. 5 and 6. The tab 39 extends outward from the edge 36 of the primary panel 22 not occupied by either of the flaps 26 and 28. In other preferred embodiments of the present invention, more than one tab 39 can extend outward from the edge 36 of the primary panel 22. As in an embodiment having three flaps 26, 28 and 30, any additional tabs 39 can also be formed within or integrated as part of the flaps 26 and 28, and/or within the primary panel 22 and/or within the secondary panel 24. In a preferred embodiment, the tabs 39 are staggered cut in any suitable group number. For example, a first envelope can have a first tab 39 on a left portion adjacent the edge 36 of the primary panel 22, a second envelope can have a tab 39 on a middle portion of the edge 36 of the primary panel 22, and a third envelope can have a tab 39 on a right portion adjacent the edge 36 of the primary panel 22.

The adhesive coating 44 preferably adheres significantly more to the sheet 12 than to the protective panel 50, such that the protective panel 50 can be removed to expose the adhesive coating 44 which preferably remains on the sheet 12. In such a preferred embodiment, the adhesive coating 44 at least partially covers the first side 14 of each of the flaps 26, 28 and 30. The adhesive coating 44 can be applied in either a continuous format 46, as shown on flap 28 in FIGS. 1 and 11, or a patterned format 48, as shown on flap 26 in FIGS. 1 and 11. The adhesive coating 44 can cover the entire first side 14 of the assembly shape 20, in which case, to prevent undesired adhesion, a protective panel 50 preferably also covers the entire area covered by the adhesive coating 44. The protective panel 50 preferably has at least one tearable line of separation 52, either die-cut or perforated with, for example, perforations and/or micro-perforations, located either along at least one of the edges 32, 34, 36 and 38 of the primary panel 22 or on at least one of the flaps 26, 28 and 30 a set distance from the primary panel 22. As shown in FIG. 1, the tearable line of separation 52 is located between an outer edge of the flap 26, 28 or 30 and the fold line 42 but it is apparent that the tearable line of separation 52 can coincide with the fold line 42. Thus, when the protective panel 50 is separated at the tearable line of separation 52, an area of adhesive coating 44 under the separated portion of the protective panel 50 is exposed.

Referring to FIGS. 1–10, to form the envelope assembly 10 into the envelope 11, at least one of the flaps 26, 28 and 30 and/or the secondary panel 24 without exposed adhesive coating 44 is folded over to face the first side 14 of the primary panel 22. The protective panel 50 is separated from the adhesive coating 44 and torn from any remaining portion of the protective panel 50, such as at the tearable lines of separation 52. The flaps 26, 28 and 30 and/or the secondary panel 24 with exposed adhesive coating 44 are preferably then folded over the first folded flaps 26, 28 and 30 and/or secondary panel 24, to construct the envelope 11. The folded flaps 26, 28 and 30 and/or secondary panel 24 are secured by contacting the exposed adhesive coating 44 with surface portions of the flaps 26, 28 and 30 and/or the secondary panel 24 without exposed adhesive coating 44.

In an alternate embodiment, the adhesive coating 44 can at least partially cover the first side 14 of the secondary panel 24, without covering any of the flaps 26 and 28, as shown in FIG. 6. In this embodiment, the flaps 26 and 28 are first folded inward, and the secondary panel 24 is subsequently folded over to face the flaps 26 and 28. Preferably then, the flaps 26 and 28 and the secondary panel 24 are secured in place with the adhesive coating 44.

Figure 8:
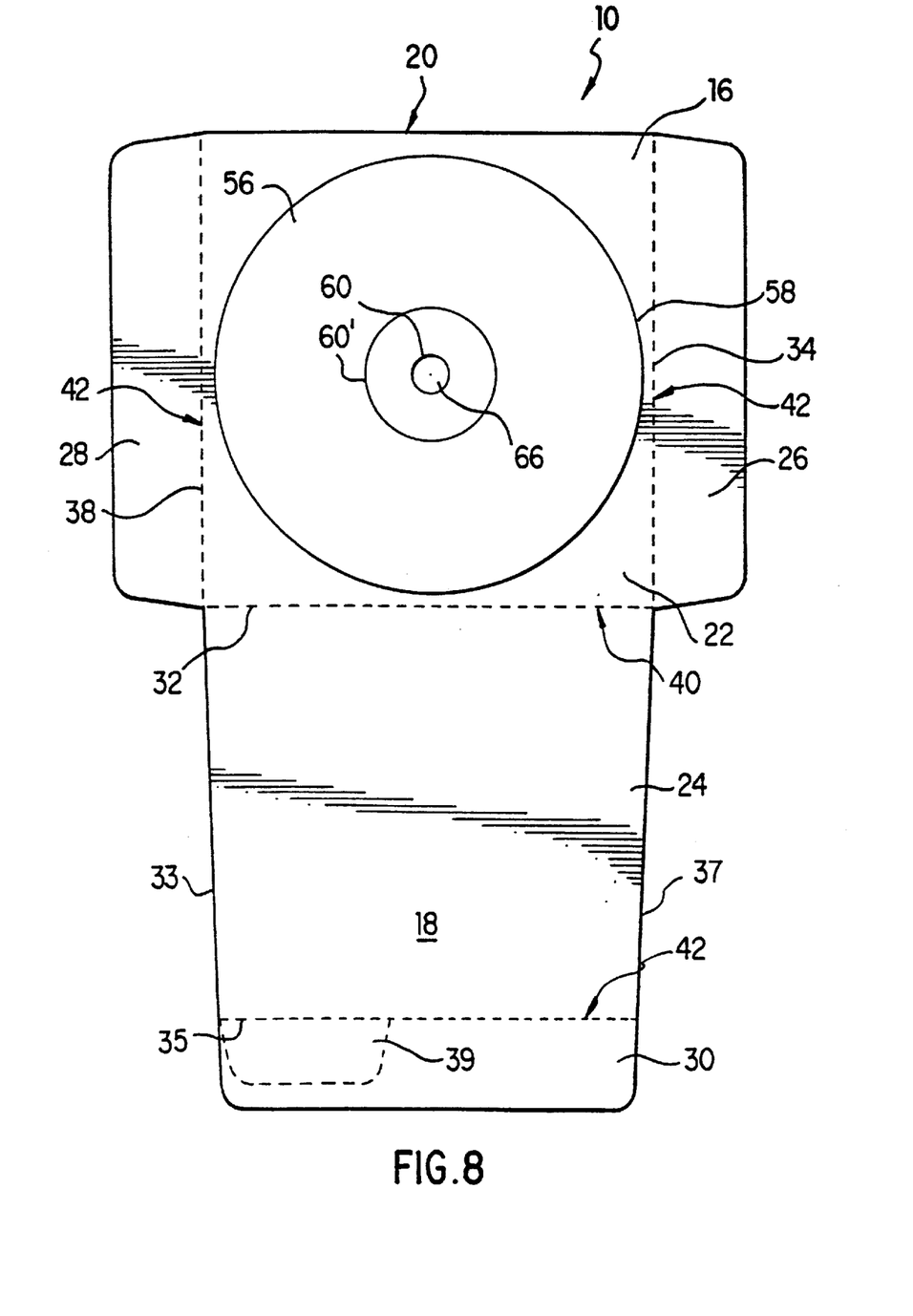
FIG. 8 illustrates a rear plan view of a sixth preferred embodiment of the envelope assembly in an unfolded position, showing a ring-shaped removable panel of a face material coated with an adhesive such that the removable panel can be separated from the assembly and, for example, adhered to a compact disc.
Figure 9:
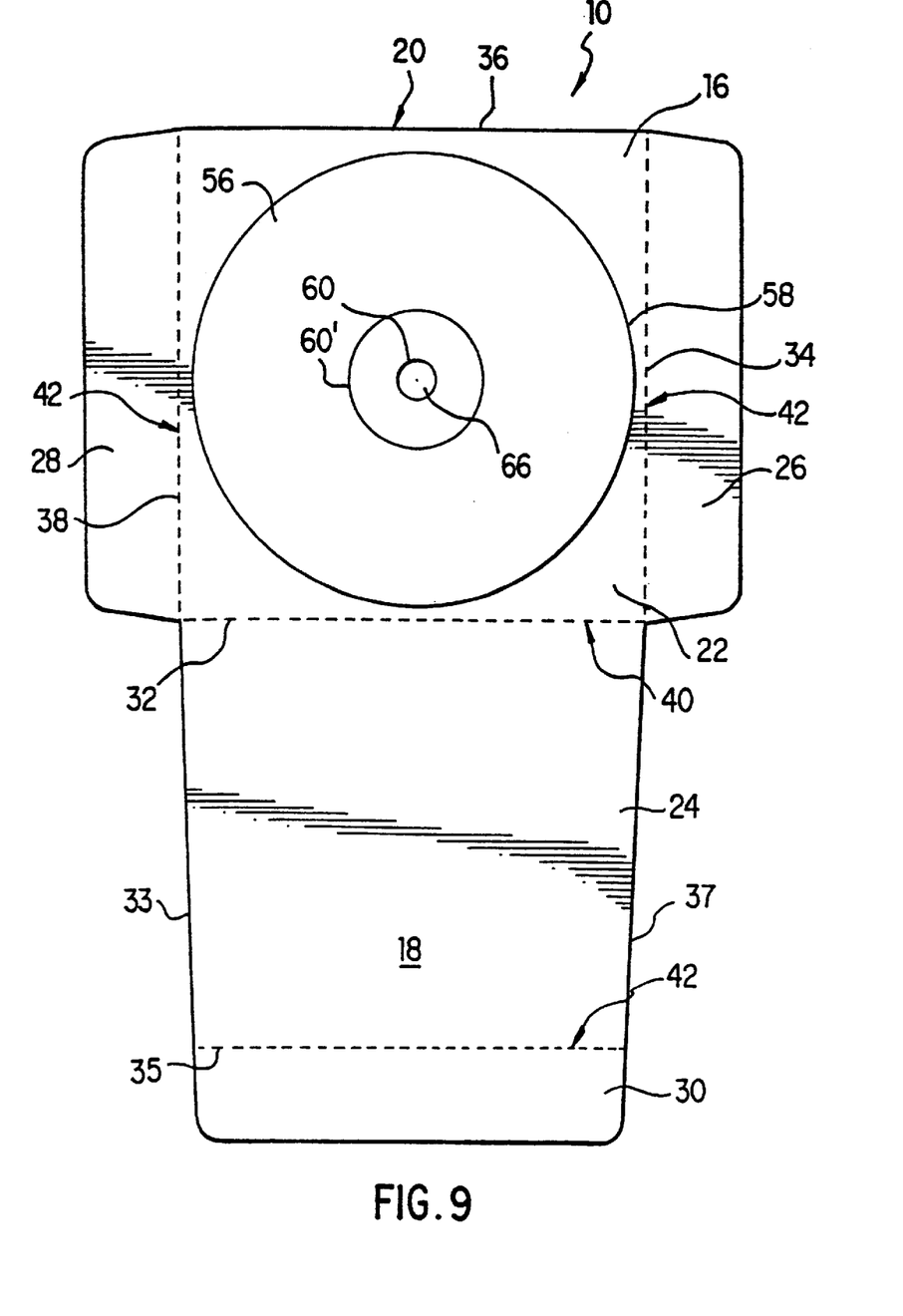
FIG. 9 illustrates a rear plan view of a seventh preferred embodiment of the envelope assembly in an unfolded position in an assembly shape having a removable panel.
Figure 10:
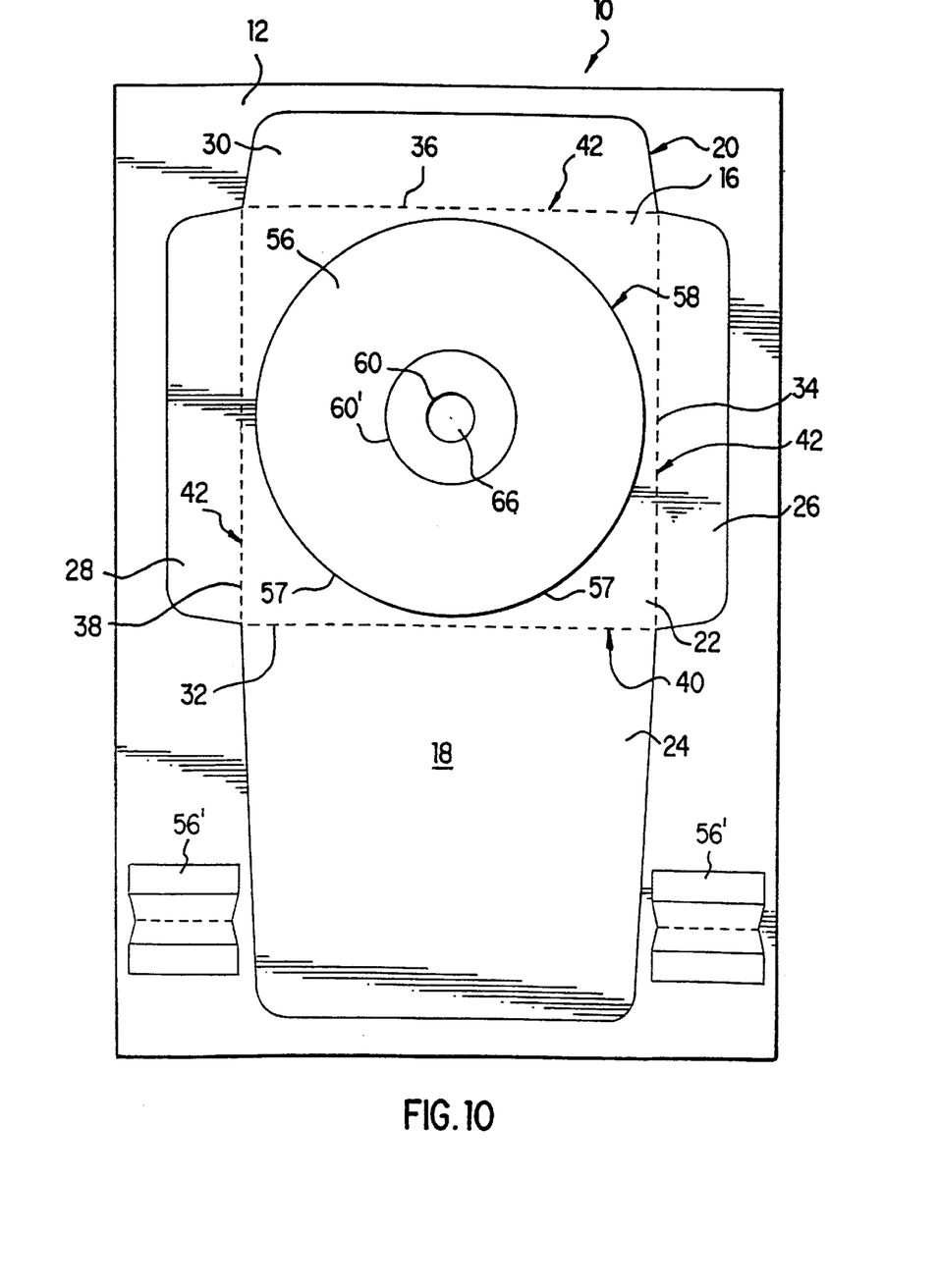
FIG. 10 illustrates a rear plan view of an eighth preferred embodiment of the envelope assembly in an unfolded position having removable panels in a remainder portion such that the removable panels can be used to form tabs.

In yet another embodiment, illustrated in FIGS. 3, 7 and 8–10, the primary panel 22 and/or the secondary panel 24 comprises at least one removable panel 56 and/or 56', preferably with at least a portion of each removable panel 56 having the printable surface 16. The removable panel 56 can be a part of the printable surface 16 of the remaining portion 21 of the sheet 12. For example, as shown in FIG. 10, the removable panel 56' can be a symmetrical shape that can be folded about a fold line and adhered to an edge 32, 34, 36 or 38 of the primary panel 22, or an edge 33, 35 or 37 of the secondary panel 24. In one preferred embodiment of the invention, the primary panel 22, the secondary panel 24, and/or the remaining portion 21 of the sheet 12 is kiss cut about at least a portion of a periphery of the removable panel 56 such that the removable panel 56 can be separated from the envelope 11 or the envelope assembly 10 while leaving intact the envelope 11 or the envelope assembly 10.

Preferably the adhesive coating 44 covers one side of the removable panel 56. The removable panel 56 can be printed upon when the sheet 12 is run through a printer. After the removable panel 56 is printed upon, the removable panel 56 can be used as a label, or a sticker, to adhere to any suitable surface. In one embodiment, the removable panel 56 has a similar shape and a surface area less than or equal to a shape and a surface area of the tab 39, such that the removable panel 56 can be adhered to and completely or almost completely cover the tab 39. As shown in FIG. 3, for example, the removable panel 56' can have a shape and size similar to one side of the tab 39.

In one preferred embodiment of the present invention, the protective panel 50 at least covers an entire area of the first side 14 of the sheet 12 corresponding to the removable panel 56 on the second side 18 of the sheet 12. The protective panel 50 can be at least partially transparent or translucent, constructed of, for example, glassine or clear plastic, such that any contents of the envelope 11 can be viewed from outside the envelope 11 with the removable panel 56 removed.

Figure 7:
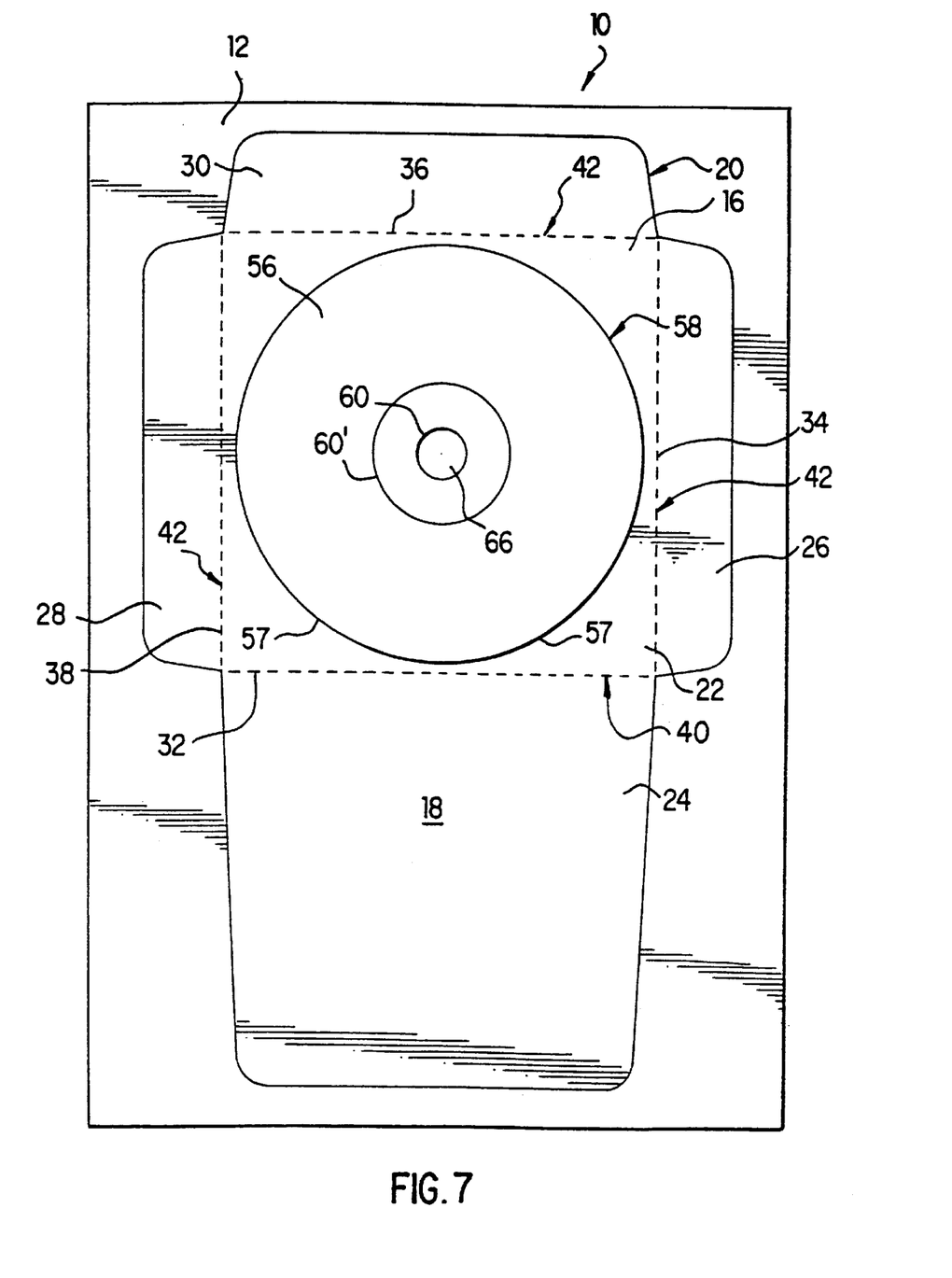
FIG. 7 illustrates a rear plan view of a fifth preferred embodiment of the envelope assembly in an unfolded position, having flaps but no tabs, and showing a ring-shaped removable panel of a face material coated with an adhesive such that the removable panel can be separated from the assembly and adhered to a compact disc.

In another embodiment, shown in FIG. 7, the removable panel 56 can be used as a label for the compact disc 54. More particularly, the second side 18 of the primary panel 22 and/or the secondary panel 24 is die-cut, perforated, microperforated or the like to form tearable line of separation 57, as shown in FIG. 9, which can be used to remove the removable panel 56 in any suitable shape, such as a circle 58, preferably slightly smaller than a diameter of a compact disc 54. Tearable line of separation 57 can also be formed as a gap between the removable panel 56 and the primary panel 22 and/or the secondary panel 24.

A second, smaller shape such as a circle 60 or 60', approximately equivalent to either a diameter of an inner cut-out circle 62 of the compact disc 54, or a diameter of an inner circle 64 on the compact disc 54 where a read/write portion of the compact disc 54 adjoins a non-read/write portion of the compact disc 54, such as shown in FIG. 2. The removable panel 56 defined by the two circles 58 and 60 can be drawn upon, typed upon, or otherwise printed upon, such as when the sheet 12 is run through a printer, and can then be separated from the protective panel 50 to which the removable panel 56 initially adheres. The removable panel 56 can then be adhered to a non-read/write side of the compact disc 54.

The protective panel 50 of this embodiment is preferably at least partially transparent or translucent, constructed of, for example, glassine or clear plastic, such that the compact disc 54 donning the removable panel 56 can be viewed from outside the envelope 11 through the transparent or translucent portion of the protective panel 50. The middle portion 66 of the label either can be printed upon during the printing process of the remainder of the printable surface 16 and used as a separate label or sticker, or the middle portion 66 can remain on the protective panel 50 after the removable panel 56 has been removed, or the middle portion 66 can simply be discarded.

Another embodiment, similar to the one shown in FIG. 7, is shown in FIG. 8. In this embodiment, the removable panel 56 is used as a compact disc label. However, like the embodiment shown in FIG. 9, the flap 30 in this embodiment is attached to the secondary panel 24 opposite the primary panel 22, rather than to the primary panel 22. Furthermore, the flap 30 is also die-cut about a portion of a periphery of a tab 39. As in the embodiments shown in FIGS. 7, 9 and 10, the removable panel 56 is bordered by the two circles 58 and 60 and can be printed upon when the sheet 12 is run through a printer, and can then be separated from the protective panel 50 to which the removable panel 56 initially adheres. The removable panel 56 can then be adhered to a non-read/write side of the compact disc 54. The protective panel 50 of this embodiment should also be at least partially transparent or translucent, constructed of, for example, glassine or clear plastic, such that the compact disc 54 donning the removable panel 56 can be viewed from outside the envelope 11 through the transparent or translucent protective panel 50.

Figure 11:
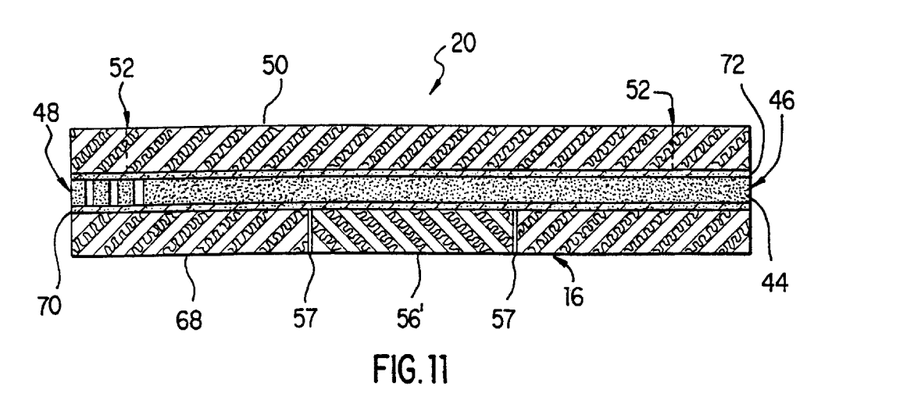
FIG. 11 illustrates a cross-section view, taken along line 11—11 as shown in FIG. 1, of the unfolded envelope assembly.

The envelope assembly 10 is preferably laminated, as shown in FIG. 11. The envelope assembly 10 preferably comprises five layers in basic construction of a pressure sensitive label. The five layers comprise: (1) a face material 68; (2) a layer of a primer 70; (3) the adhesive coating 44; (4) the silicone coating 72; and (5) the protective panel 50. The face material 68 has a printable surface 16, as shown in FIGS. 3 and 11. The primer 70 is a layer or coating applied to the face material 68 that improves a bond between the adhesive coating 44 and the face material 68. The primer 70 also acts as a barrier to migration of chemicals that could stain the face material 68. The adhesive coating 44 allows the face material 68 to be affixed to a surface, such as securing one part of the face material 68 to another part of the face material 68 in assembling the envelope 11. The silicone coating 72 at least partially covers at least one side of the protective panel 50 and allows for easy "release" of the protective panel 50 from the adhesive coating 44. During manufacture, the adhesive coating 44 laminates the face material 68 to the silicone coated protective panel 50.

In a preferred embodiment of the present invention, the protective panel 50 is of a size smaller than the sheet 12 and at least slightly larger than the removable panel 56. More particularly, in a preferred embodiment of the present invention geared toward housing the compact disc 54, the protective panel 50 is preferably about 5" by about 5". The silicone coating 72 is applied in a layer to one side of the protective panel 50, such as in a manner known to those skilled in the art of labels. A layer of the adhesive coating 44 is then applied to and preferably covers the silicone coating 72. The protective panel 50 is then positioned over the second side 18 of the removable panel 56. When the removable panel 56 is separated from the envelope 11 or the envelope assembly 10, the adhesive coating 44 in contact with the removable panel 56 will release from the silicone coating 72 and will remain on the removable panel 56. The adhesive coating 44 in contact with an area surrounding the removable panel 56 on the second side 18 of the sheet 12 maintains the protective panel 50 in place with respect to the sheet 12 once the removable panel 56 has been removed.

The envelope assembly 10 of the present invention is suitable for a wide number of uses. Prior to folding and assembling, or even subsequent to folding and assembling, the envelope assembly 10 can be fed into and run through a printer for labeling and/or decorating any portion, including the tab 39 and the removable panel 56, or all of the resulting envelope 11. In its folded form, the envelope assembly 10 is a suitable size for holding compact discs 54. The envelope assembly 10 can be scaled up or down to house numerous other items, including stationery, photographs, and minidiscs.

While in the foregoing specification this invention has been described in relation to certain preferred embodiments thereof, and many details have been set forth for purpose of illustration, it will become apparent to those skilled in the art that the invention is susceptible to additional embodiments and that certain of the details described herein can be varied considerably without departing from the basic principles of the invention. Therefore, to particularly point out and distinctly claim the subject matter regarded as the invention, the following claims conclude the specification.

We claim:

1. An envelope comprising:
  a primary panel;
  a secondary panel;
  three flaps, with two of the flaps adjacent the secondary panel and one of the flaps adjacent the primary panel;
  at least one indexing tab extending outward from the primary panel and extending along an edge of the primary panel for a distance less than a length of the edge of the primary panel;
  an adhesive coating at least partially covering one side of at least one of the primary panel, the secondary panel and the flaps; and
  a protective panel to which the adhesive coating adheres significantly less than to the at least one of the primary panel, the secondary panel and the flaps.

2. An envelope comprising:
  a primary panel;
  a secondary panel;
  three flaps, at least two of the flaps adjacent the primary panel and a third flap adjacent one of the primary panel and the secondary panel;
  at least one indexing tab extending outward from the primary panel and extending along an edge of the primary panel for a distance less than a length of the edge of the primary panel;
  an adhesive coating at least partially covering one side of at least one of the primary panel, the secondary panel and the flaps; and
  a protective panel to which the adhesive coating adheres significantly less than to the at least one of the primary panel, the secondary panel and the flaps.

3. An envelope comprising:
  a primary panel;
  a secondary panel;
  a plurality of flaps, at least one of the flaps adjacent the primary panel;
  at least one indexing tab extending outward from the primary panel and extending along an edge of the primary panel for a distance less than a length of the edge of the primary panel, wherein a portion of a periphery of the at least one indexing tab is die-cut from one of the flaps;
  an adhesive coating at least partially covering one side of at least one of the primary panel, the secondary panel and the flaps; and
  a protective panel to which the adhesive coating adheres significantly less than to the at least one of the primary panel, the secondary panel and the flaps.

4. The envelope of claim 3 wherein at least one surface of the positioned between the protective panel and the adhesive coating.

5. An envelope comprising:
  a primary panel;
  a secondary panel adjacent an edge of the primary panel;
  a flap along an edge of one of the primary panel and the secondary panel;
  at least one indexing tab extending outward from the primary panel and extending along an edge of the primary panel for a distance less than a length of the edge of the primary panel, wherein a portion of a periphery of the at least one indexing tab is die-cut from the flap;
  at least one removable panel;
  an adhesive coating at least partially covering one side of at least one of the primary panel and the secondary panel; and
  a protective panel adhering to the adhesive coating significantly less than the at least one of the primary panel and the secondary panel adheres to the adhesive coating.

6. The envelope of claim 5 wherein at least one of the primary panel and the secondary panel comprises a printable surface.

7. The envelope of claim 5 further comprising a layer of silicone envelope comprises a printable surface.

8. The envelope of claim 5 wherein the protective panel has at least one tearable line of separation located a set distance from at least one edge of at least one of the primary panel and the secondary panel.

9. A sheet of material comprising:
  an assembly shape within the sheet, the assembly shape defining a primary panel, a secondary panel, and a plurality of flaps, at least one of the flaps adjacent the primary panel;
  at least one indexing tab extending outward from the primary panel and extending along an edge of the primary panel for a distance less than a length of the edge of the primary panel, wherein a portion of a periphery of the at least one index tab is die-cut from one of the flaps;
  an adhesive coating at least partially covering one side of the assembly shape; and
  a protective panel to which the adhesive coating adheres significantly less than to the sheet.

10. The sheet of claim 9 wherein the sheet has overall dimensions of about 8.5" by about 11".

11. The sheet of claim 9 wherein at least one surface of the sheet comprises a printable surface.

12. The sheet of claim 9 wherein the sheet of material is laminated.

13. The sheet of claim 9 wherein the sheet is die-cut along at least a portion of a periphery of the assembly shape.

14. The sheet of claim 9 wherein the sheet ha s a plurality of perforations along at least a portion of a periphery of the assembly shape.

15. The sheet of claim 9 wherein the sheet has a plurality of micro-perforations along at least a portion of a periphery of the assembly shape.

16. The sheet of claim 9 wherein the sheet has at least one primary fold line separating the primary panel from the secondary panel.

17. The sheet of claim 9 wherein the sheet has at least one secondary fold line separating the primary panel from each of the flaps.

18. The sheet of claim 9 wherein the adhesive coating is one of patterned and continuous.

19. The sheet of claim 9 wherein the protective panel substantially covers one side of the sheet.

20. The sheet of claim 9 wherein the protective panel has at least one tearable line of separation located on at least one of the flaps a set distance from the primary panel.

21. The sheet of claim 20 wherein the at least one tearable line of separation borders the primary panel and the at least one of the flaps.

22. A sheet of material comprising:
  an assembly shape within the sheet, the assembly shape defining a primary panel, a secondary panel, and three flaps, at least two of the flaps adjacent the primary panel and a third flap adjacent one of the primary panel and the secondary panel;

at least one indexing tab extending outward from the primary panel and extending along an edge of the primary panel for a distance less than a length of the edge of the primary panel;

an adhesive coating at least partially covering one side of the assembly shape; and a protective panel to which the adhesive coating adheres significantly less than to the sheet.

23. A sheet of material comprising:

an assembly shape within the sheet, the assembly shape defining a primary panel, a secondary panel, and three flaps, with two of the flaps adjacent the secondary panel and one of the flaps adjacent the primary panel;

at least one indexing tab extending outward from the primary panel and extending along an edge of the primary panel for a distance less than a length of the edge of the primary panel;

an adhesive coating at least partially covering one side of the assembly shape; and a protective panel to which the adhesive coating adheres significantly less than to the sheet.

* * * * *